United States Patent [19]

Delamare et al.

[11] Patent Number: 4,979,620
[45] Date of Patent: Dec. 25, 1990

[54] METHOD AND APPARATUS FOR PROTECTING OBJECTS FROM SHOCKS AND VIBRATIONS

[75] Inventors: Pierre Delamare; Philippe Delamare, both of Criqueboeuf sur Seine, France

[73] Assignee: Etablissements Pierre Delamare et Cie, Criqueboeuf sur Seine, France

[21] Appl. No.: 224,290

[22] Filed: Jul. 25, 1988

Related U.S. Application Data

[63] Continuation of Ser. No. 39,689, Apr. 17, 1987, abandoned.

[30] Foreign Application Priority Data

Apr. 25, 1986 [FR] France .................. 86 06146

[51] Int. Cl.⁵ ............................. B65D 81/08
[52] U.S. Cl. .................... 206/594; 206/521; 206/586
[58] Field of Search ............ 206/521, 523, 584, 586, 206/591–594, 585; 248/634

[56] References Cited

U.S. PATENT DOCUMENTS

| | | |
|---|---|---|
| 1,876,063 | 9/1932 | Kronenberger ............... 206/521 X |
| 2,019,778 | 11/1935 | Enholm et al. ............... 206/584 |
| 2,645,334 | 7/1953 | Aldridge ..................... 206/591 X |
| 2,809,760 | 10/1957 | Clark . |
| 3,048,668 | 8/1962 | Weiss ........................ 206/594 X |
| 3,131,240 | 4/1964 | Kirkpatrick . |
| 3,161,339 | 12/1964 | Weller ........................ 206/521 |
| 3,262,598 | 7/1966 | Carder et al. ............... 206/594 X |
| 3,283,988 | 11/1966 | Hardigg ..................... 206/523 X |
| 3,675,746 | 7/1972 | Irvine ........................ 206/586 X |
| 4,075,138 | 2/1978 | Garner . |

FOREIGN PATENT DOCUMENTS

| | | |
|---|---|---|
| 2017483 | 10/1971 | Fed. Rep. of Germany . |
| 1137075 | 1/1957 | France . |
| 1178886 | 12/1958 | France . |
| 1401229 | 4/1965 | France . |
| 2192124 | 2/1974 | France . |
| 2192125 | 2/1974 | France . |
| 2518067 | 6/1983 | France . |
| 0848248 | 9/1960 | United Kingdom . |

*Primary Examiner*—Bryon P. Gehman
*Attorney, Agent, or Firm*—Sandler, Greenblum & Bernstein

[57] ABSTRACT

A method and apparatus for holding objects and protecting them from shocks and vibrations, formed of tubular sections made of a deformable material. The apparatus is adapted to be compressed and is capable of substantially resuming its dimensional and load carrying characteristics after several force applications. The apparatus is adapted to surround the object to be protected at least partially, directly or indirectly, and itself is then covered or surrounded by an external packing or packaging structure. Preferably, the tubular elements have, in cross-section, an outer contour and an inner contour, which may or may not be identical and are chosen from the group formed by circular, oblong and polygonal, curvilinear or rectilinear contours. In transverse cross-section, the central open area of the tubular element with respect to the total area, including the open area, is between 1 and 25%.

37 Claims, 5 Drawing Sheets

FIG.1.

PRIOR ART

METHOD AND APPARATUS FOR PROTECTING OBJECTS FROM SHOCKS AND VIBRATIONS

This application is a continuation of application Ser. No. 039,689, filed Apr. 17, 1987, now abandoned.

BACKGROUND OF THE INVENTION

The present invention relates to a new device for holding objects and protecting them against shocks during transport or storage thereof.

The invention provides a new structure adapted for insertion between the object to be protected and its outer packing or packaging while forming a shock absorbing holding means more efficient than the systems known at present and, more precisely, more progressive in its capacity for absorbing shocks or forces exerted on said packing or packaging.

SUMMARY OF THE INVENTION

For this, the invention provides a device for holding objects and protecting them against shocks, formed of tubular sections made from a material deformable under compression and capable of resuming its dimensional and load carrying characteristics, either identical or very little degraded, after several force applications, surrounding the object to be protected at least partially, directly or indirectly, and themselves covered or enveloped in an external packing or packaging structure.

By object is meant a single object or a plurality of objects grouped together in an intermediate packing, for example a case or box made from wood or cardboard.

The shock-absorbing elements are preferably tubular with a circular external contour and an equally circular or multilobed inner contour, made from a plastic material with closed cells such as polyethylene and has in section a central recessed area of the order of about 1 to 25% of the total area of the section, recessed central zone included.

It was in fact discovered, after research work, tests and measurements, that it was with this type of shock-absorption element that the most remarkable and surprising results were obtained as to the efficiency of the elements as shock absorbing and holding means between an object, in the above defined meaning, and an external packing or packaging such as a case, box, heat shrinkable film, or a pallet.

BRIEF DESCRIPTION OF THE DRAWINGS

For a better understanding of the unexpected and remarkable character of the behavior of the sausages of the invention as shock absorbing and holding elements, reference may be made to the following description with reference to the accompanying drawings in which.

DESCRIPTION OF THE PREFERRED EMBODIMENTS

Figure 1:
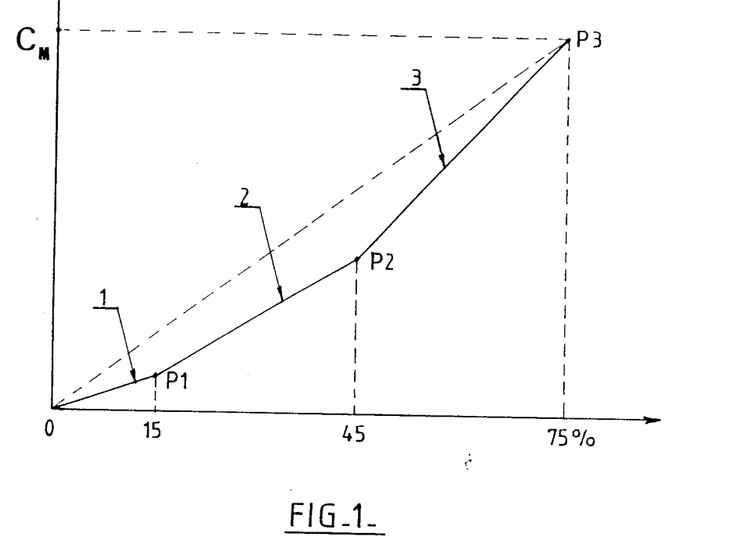
FIG. 1 is a curve, considered as optimum or ideal, under given crushing conditions of a shock absorbing structure as a function of the compression stress.

In FIG. 1 is shown a reference system showing as abscissa the crushing of the shock absorbing material expressed as % with respect to the unstressed material and as ordinates the compression stress to which the material is subjected.

Point P3 is determined as a function of each object to be packed and two constraints, one imposed by the nature of the shock absorbing material and which is represented by a maximum admissible crushing threshold, fixed along the abscissa (for example 75%) and the other the resultant of the three following parameters: weight of the object—height of maximum admissible fall and fragility threshold of the object expressed by the maximum deceleration which the object may withstand.

This resultant is represented by a maximum compression stress $C_M$, fixed along the ordinates of FIG. 1, and expressed for example in $g/cm^2$ of the load supporting surface.

The curve shown in FIG. 1 by the three successive segments 1 to 3 connecting the origin 0 to point P3 is a shock absorbing curve considered as optimum or ideal for the object considered.

The first segment 1 corresponds to the need of filtering the small shocks and vibrations inherent in the transport and handling. With this end in view, segment 1 corresponds substantially to a straight line of low slope representing a zone of great flexibility for the small stresses, giving considerable deformation of the material protecting the object.

It is advantageous to have this shock absorbing flexibility at the beginning of crushing of the material, for example up to about 15% crushing, as illustrated in FIG. 1 (point P1).

It is moreover also advantageous to have, beyond about 45 to 50% crushing of the material, a substantially linear shock absorbing curve (segment 3), of substantially greater slope and corresponding to a zone of high energy absorption for the high stresses relative to maximum crushing and, finally, to have between segments 1 and 3 an intermediate or transition connection curve, formed by segment 2, whose slope is intermediate between those of segments 1 and 3.

Thus, the curve 1, 2, 3 considered as ideal is a progressive theoretic curve capable of providing optimum protection under the conditions fixed at the outset.

The present invention aims at providing a holding and shock absorbing device capable of better approximating this theoretical curve.

Known holding devices have performances very far removed from this theoretical curve.

Figure 2:
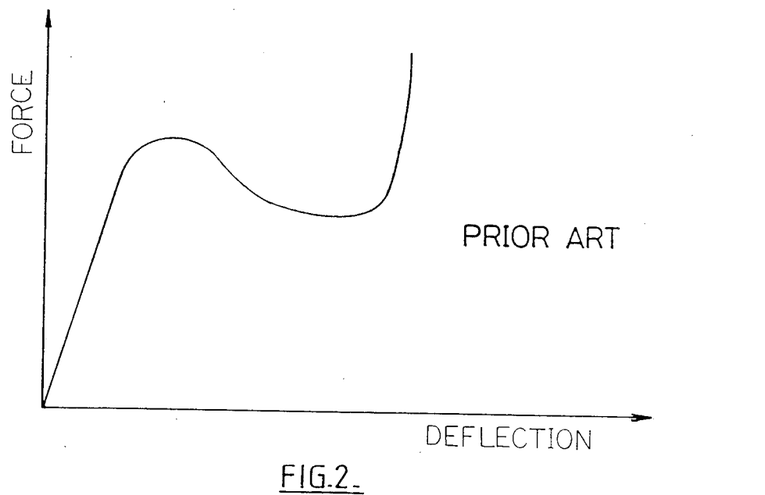
FIG. 2 is a curve obtained with a first known structure.

FIG. 2 illustrates for example the crushing curve as a function of the compression stress of a holding element of a type described in U.S. Pat. No. 3,262,598 and is formed by a hollow tube section of square cross section.

In this document, the lateral sides of said tube section, because of the reaction to the lateral flexion forces, are charged with providing a resistance which is added to that of the material when the structure is subjected to crushing. That results in the curve shown in FIG. 2 by a first rectilinear part and of very steep slope representing a great hardness of the shock absorbing structure until, suddenly, the two lateral sides of the tube give way (lateral flexion phenomenon corresponding to the rounded and downgoing part of the curve, following the linear rising part). At that time, the resistance of the structure collapses literally to then become very hard again, the structure becoming practically incompressible.

It is obvious that such a curve is in no way comparable to the curve shown in FIG. 1 for it shows absolutely no progressive and continuous character of said curve 1, 2, 3.

Figure 3:
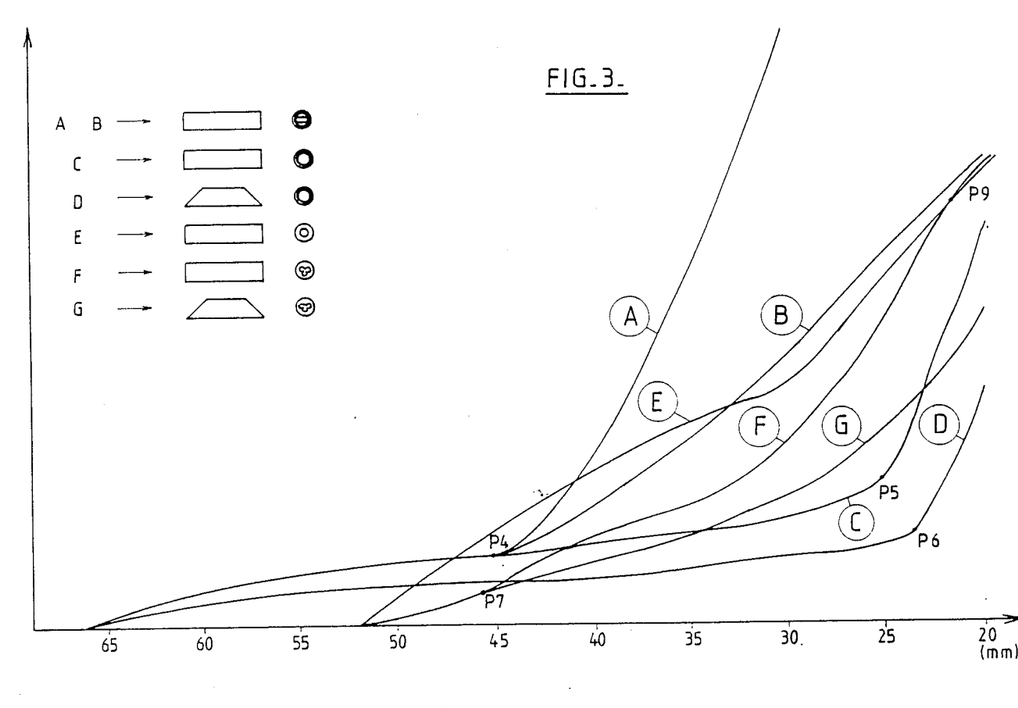
FIG. 3 shows several other curves of known structures as well as different curves obtained from holding and shock absorbing devices conforming to the invention.

In FIG. 3 other curves have been shown for known holding and shock absorbing devices.

The different curves follow from tests carried out by a private measurement laboratory, the Bureau de Verification Technique which is approved by the Ministère des Transports et de l'Industrie and relate to seven samples referenced A to G whose characteristics are given in FIG. 3 and hereafter.

The thickness variation (in millimeters) of the shock absorbing elements (samples) have been plotted as abscissa with respect to the variations of the compression stress plotted as ordinates, exerted on the cylindrical samples perpendicular to the axis. The axis of the ordinates do not bear any compression stress unit for they were very variable depending on the nature of the materials and on the samples. It is in fact the trend of the curves which is essentially important in comparison with the trend of the curve of FIG. 1.

The curves of samples A, B, C and D correspond to holding and shock absorbing structures of the type described in French patent No. 1 137 075.

Sample A is a circular rubber tube having a length of 100 mm, an outer diameter of 66 mm and a thickness of 10 mm, the inside of the tube being provided with a polythene insert (closed cells) having a cross section of 20 mm ×20 mm and of the same length as the tube.

Sample B is identical to sample A but includes a central insert made from polyurethane (open cells).

Sample C is an empty tube identical to the tube of samples A and B.

Sample D is a tube identical to the tube of sample C but chamfered at each end at about 45°, the small base measuring 55 mm.

In FIG. 3, for the three curves A, B, C, a very low slope can be seen as far as a reduction of the external diameter of the samples of the order of 20 mm or so (point P4). This behavior is due solely to crushing of the tubular part of the samples. Beyond point P4, the behavior of the samples diverges depending on the nature of the internal insert or on the absence thereof.

After P4, the curve rises fairly suddenly for sample A and more progressively for sample B. As for curve C, it continues beyond P4 with a very low slope until the moment (point P5) where the tube is completely flattened and then suddenly offers a higher resistance.

Curve D is even flatter than curve C, which is not surprising and rises beyond point P6 corresponding to flattening of the tube.

None of curves A to D is satisfactory, and by far, for they are all very much removed from the ideal curve of FIG. 1.

For all the samples A to D the percentage of crushing for small stresses is much too great, the curves being much too flat. Furthermore, at the end of crushing, said curves rise too suddenly and have therefore inflexion points which are too pronounced, of course adversely affecting the progressivity of the shock absorber.

On the contrary, tests carried out with different samples of holding and shock absorbing elements in accordance with the invention (curves E, F and G) have quite surprisingly and unexpectedly shown behavior very much removed from that of samples A to D and extremely close to the ideal behavior illustrated in FIG. 1;

Sample E is a polyethylene tube (closed cells) having a length of 100 mm, an outer diameter of 52 mm and an inner diameter of 15 mm.

Sample F is a tube identical to the tube of sample E but the inner contour is no longer circular but three lobed (mean diameter about 15 mm).

Sample G is a tube identical to that of sample F chamfered at about 45° at its ends.

The difference in trend between curves A to G in FIG. 3 is striking.

Figure 4:
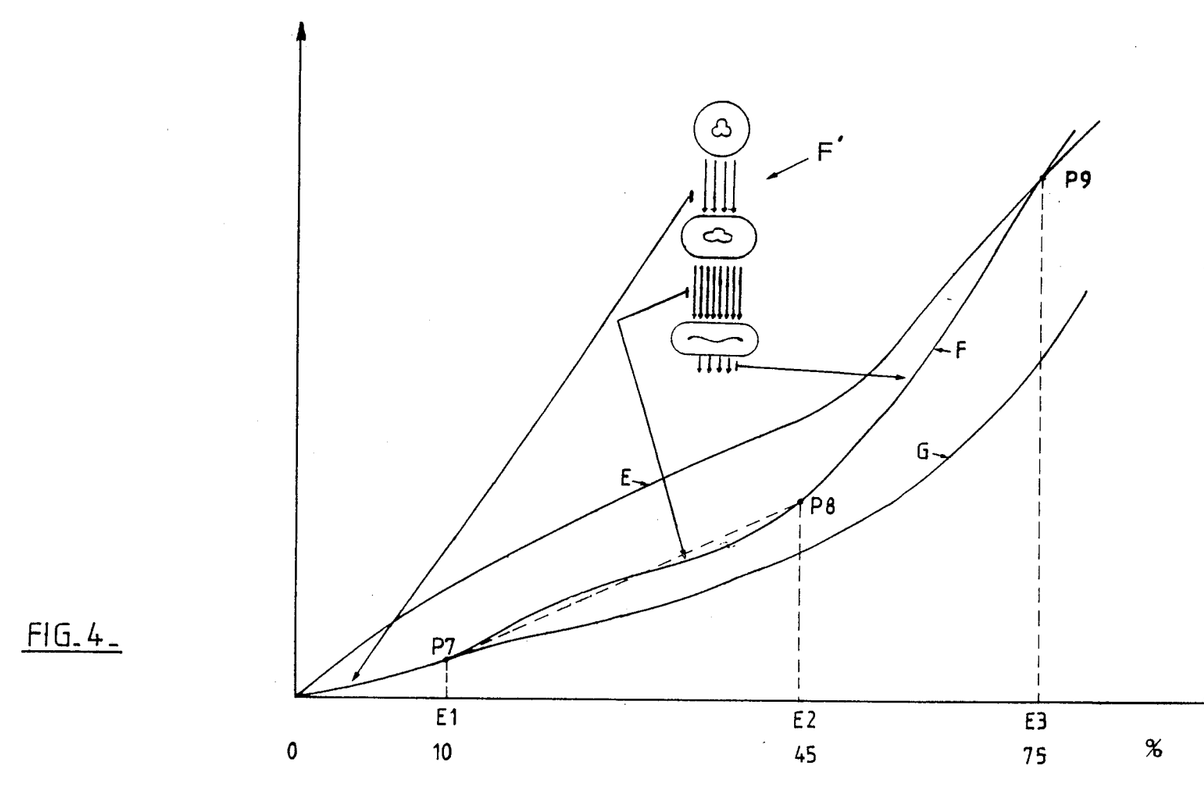
FIG. 4 shows only the curves of FIG. 3 relative to the device of the invention.

For the sake of clearness, curves E, F and G have been shown in FIG. 4 in the same reference system as that of FIG. 1 (percentage of crushing shown as abscissa and compression stress as ordinates), the curves being strictly the same as those of FIG. 3.

It is curve F which is the closest to the ideal curve of FIG. 1 to the point of practically merging therewith. A first part OP7 can in fact be seen corresponding substantially to segment 1 of FIG. 1, followed by a second part P7P8 corresponding substantially to segment 2 and, finally, a third part P8P9 corresponds substantially to segment 3 of FIG. 1. In FIG. 4, the progressive sectional crushing of sample F has been illustrated at F'. Points P7, P8 and P9 correspond to crushing percentages of 10, 45 and 75 respectively, which is extremely close to the corresponding values plotted in FIG. 1.

Curve E is a little "harder" than curve F while having a very closely related and quite acceptable trend. The difference in behavior between samples E and F may be explained by the fact that the procedure of extruding a circular internal contour (sample E) distributes the stresses uniformly, whereas with an internal three lobed contour, such as the one shown in FIG. 7, there is destruction of this uniformity of the stresses causing at the outset, for sample F, a lower resistance to crushing.

It should be noted that with samples E and F the same maximum admissible crushing percentage is reached (P9) for the same stress, sample F having however better flexibility.

Curves F and G are common as far as point P7, which indicates that the chamfers formed on sample G provide no improvement in flexibility in the case of small shocks. Beyond points P7, curve G is "flatter" than curve F and, especially, the maximum crushing percentage (75%) is reached well before the prefixed compression limit is reached (corresponding to the ordinate of point P9).

If the curves A to D of FIG. 3 were transferred to FIG. 4, from the origin O, extremely flattened curves would be obtained and very much below curve G, that is to say much too "flat" and, furthermore, without good progressivity because of the sudden slope variations (points P4, P5, P6).

Figures 5, 6, 7, 9:
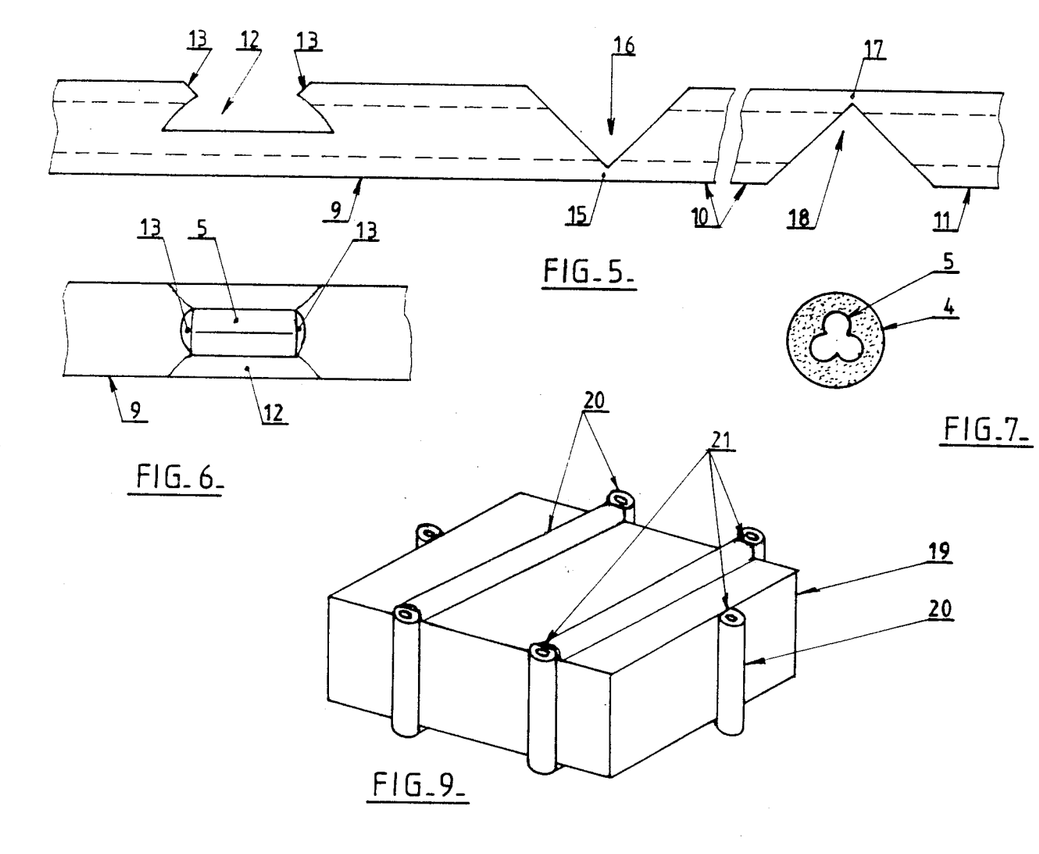
FIG. 5 shows in side elevation a string of tube sections joined together and formed from the same tube.
FIG. 6 is a partial top view of the string of FIG. 5.
FIG. 7 is a sectional view of a sausage according to the invention having a three lobed inner contour.
FIG. 9 illustrates another method of positioning the device of the invention.

The holding and shock absorbing device of the invention is formed from tubular sausage sections, such as the one shown in section at 4 in FIG. 7 (whose outer contour is circular, oblong or formed by a polygon with curvilinear or rectilinear sides and, generally, such that during crushing perpendicular to the axis of the tubular sections, the contact surface between the tubular sections and the support on which it is crushed increases substantially progressively with the compression stress.

The tubular section has a central recess preferably coaxial there with whose inner contour, is for example circular (sample E), oblong or formed by a curvilinear or rectilinear polygon, for example a three lobe 5 in the form of a clover leaf as shown in FIG. 7 (samples F and G).

The material forming the tubular section may be a plastic material foam with closed or open cells, such as polyethylene, polyurethane, PVC, polyether, polyester or else natural or synthetic rubber or else composite conglomerate.

The best results were obtained with sections of the type shown in FIG. 7 (sample F), that is to say made from polyethylene with a circular external contour of the order of 50 mm in diameter and with a three lobed internal contour with a mean diameter of the order of 15 mm. The ratio of the mean diameter to the external diameter is of the order of 0.3.

More precisely, in the terms of area considered depending on the cross-section of the section, the central recessed area is of the order of 9% of the total area including the recess zone. Tests have shown that said percentage of the recessed central zone may be substantially varied and that, when this percentage is in the range of 1 to 25% of the total section, the shock absorbing curves are still very advantageous. Of course, the further away from the above mentioned preferred value, the greater the risk of moving away from the ideal curve shown in FIG. 1, but still remaining however far from the curves such as A to D. Thus, the central recess may even be omitted while obtaining sections with acceptable performances in the case of heavy objects.

It should be noted that the material forming the tubular sections may possibly be subjected to a surface treatment, at right angles to the inner surface, for making the material rigid over a certain thickness and thus locally modifying the physical properties.

The device of the invention may be positioned in different ways. Generally, preferably, it is inserted between the object in the above defined meaning and an external packing or packaging structure totally enveloping or not, rigid or not.

The holding device is in direct contact with the object or in indirect contact with a cardboard sheet for example inserted between it and the object.

Figure 8:
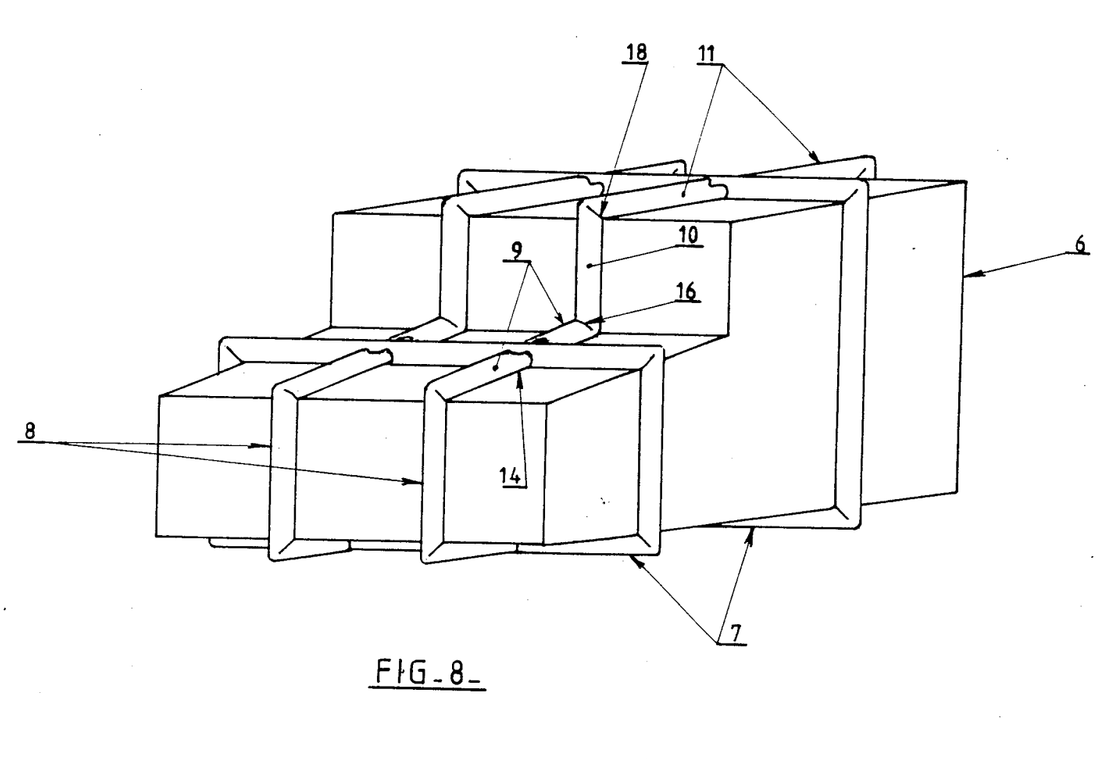
FIG. 8 is a schematical perspective view of an object girdled with the holding device of FIG. 5.

FIG. 8 illustrates one method of using the device of the invention consisting in girdling the object 6 which has a general polyhedral shape and is formed for example by an apparatus or machine directly in contact with the holding and shock absorbing device.

This latter is formed of two pairs of closed loops 7 and 8 girdling the object 6 while intersecting at right angles.

Loops 8 are formed from a polyethylene section recessed transversely in the way shown in FIGS. 5 and 6, the sausage in section having the profile shown in FIG. 7.

In FIG. 5, three sections 9, 10 and 11 have been shown connected together.

Section 9 has a transverse recess 12 in the form of a dove tail whose bottom is close to the axis of the tubular section. The upper edges of recess 12 are chamfered at 13 (see also FIG. 6) so as to facilitate the insertion of another section such as 9 also having a recess 12, fitting the two recesses 12 together providing a weldless joint (such as 14 in FIG. 8) and at right angles to loops 7, 8, without overthickness.

Section 9 is separated from section 10 by bridge 15 formed by a deep V recess 16 opening on the same side of the tubular section as recess 12.

Section 10 is separated from section 11 by a bridge 17 formed by means of a deep recess 18 identical to recess 16 but diametrically opposite.

Recesses 16, 18 form an angle of 90° so that sections 9, 10 and 10, 11 may be placed at right angles for assuming the shapes of the faces and angles, salient or reentrant, of object 6, the length of the different sections of the string forming each loop 7, 8 corresponding to that of the face of the object on which each section is applied.

In FIG. 8, one of the loops 8 includes, on the upper face of object 6, a section 9 crossing one of the loops 7, a section 10 and a section 11 also having a dove tail recess 12 for the crossing junction with the other loop 7. In the angles, the V recesses 16 and 18 are practically closed. Loops 7 and 8 are not fixed to the surface of object 6 and are held in position by their mutual connections alone.

Loops 7 and 8 can be readily produced automatically by machine from an extruded tube, cut into lengths corresponding to those of the different loops 7, 8 and recessed, for example by means of a cutter or punch, as a function of a program of recesses 12, 16 and 18 spaced along each loop depending on the morphology of the object to be protected.

The positioning of the loops girdling the object can be achieved very readily by hand.

The ends of each loop are joined end to end by welding.

Object 6, with its protective loops 7, 8, is then placed for example in a dispatch case made from corrugated cardboard whose internal faces come into contact with said loops 7, 8.

FIG. 9 illustrates another way of protecting a parallelepipedic volume 19, for example a cardboard packing box in which one or several objects are disposed.

Each external face of volume 19 is provided with one or more sausage sections 20 such as the one shown in FIG. 7.

Each section 20 has a flat portion 21 coated with a bonding agent or adhesive film for bonding against the faces of volume 19, at the desired positions and so as to form loops or not.

The number, length and external diameter of sections 20 may vary in large proportions depending on the nature of the object to be protected and on the complementary packagings surrounding the protected object or inserted between the object and the protection device of the invention.

It should be noted that the sections, individual or not, may be bent for applying to curved surfaces.

The protected object such as shown in FIG. 9 is, like the object shown in FIG. 8, intended to be enclosed for example in a cardboard dispatching case.

Finally, the invention is not limited to the embodiments shown and described above but covers on the contrary all variants thereof.

What is claimed is:

1. A device for protecting an object from shocks and vibrations, said device comprising a plurality of tubular elements connected together to form a first loop to surround the object, each said tubular element extending along a longitudinal axis and being comprised of deformable material, each said tubular element being substantially formed of one material, each said tubular element capable of progressively deforming and substantially resuming dimensional and load-carrying characteristics transverse to said longitudinal axis of each said tubular element after having a force applied transverse to said longitudinal axis, each said tubular element further comprising, in transverse cross-section, an outer periphery, defining a total area, and an inner periphery, defining an open area, wherein said open area is approximately between 1% and 25% of said total area.

2. The device according to claim 1, wherein said outer periphery and said inner periphery have shapes which are substantially the same.

3. The device according to claim 1, wherein said outer periphery and said inner periphery have shapes which are different.

4. The device according to claim 1, wherein said outer periphery and said inner periphery have shapes selected from the group consisting of circular, oblong, polygonal, curvilinear portions, and rectilinear portions.

5. The device according to claim 1, wherein each said tubular element is made from a material selected from the group consisting of open-celled plastic foam, closed-cell plastic foam, synthetic rubber, natural rubber, and composite conglomerates.

6. The device according to claim 1, wherein said outer periphery is circular, said inner periphery comprises three lobes, and wherein said open area is approximately between 9% and 10% of said total area.

7. The device according to claim 6, wherein said tubular element is made from polyethylene.

8. The device according to claim 1, each said tubular element comprising at least one substantially flat portion for positioning adjacent said object to be held and protected.

9. The device according to claim 8, further comprising adhesive provided on said substantially flat portions.

10. The device according to claim 1, wherein said object comprises a plurality of surfaces having predetermined dimensions, wherein each said tubular element of said loop is adapted to be positioned adjacent a respective surface of said plurality of surfaces of said object, and wherein each said tubular element has a length substantially the same as that of a respective surface of said object.

11. The device according to claim 10, wherein adjacent surfaces of said object are disposed at predetermined angles relative to each other, and wherein adjacent tubular elements are joined at V-shaped recesses to thereby permit said adjacent tubular elements to assume said predetermined angles.

12. The device according to claim 1, further comprising at least a second plurality of said tubular elements connected together to form at least a second loop to surround said object, said second loop and said first loop having areas of intersection.

13. The device according to claim 12, wherein at said areas of intersection of said first loop and said second loop, a tubular element of said first loop and a tubular element of said second loop each comprises a recess which interfit with one another.

14. The device according to claim 13, wherein said recesses form a dovetail type connection between a tubular element of said first loop and a tubular element of said second loop.

15. The device according to claim 1, further comprising a packaging structure, whereby said device is positioned adjacent said packaging structure to thereby hold and protect said object within said packaging structure.

16. The device according to claim 15, wherein said object comprises a predetermined number of surfaces and wherein at least one tubular element is positioned adjacent each of said surfaces within said packaging structure.

17. The device according to claim 1, wherein said open area is approximately between 3% and 10% of said total area.

18. The device according to claim 1, each of said tubular elements having substantially the same cross-sectional shape and dimensions.

19. The device of claim 1 wherein said element is capable, during the application of a force applied transversely to said longitudinal axis, of progressively deforming, during which said open area is adapted to be progressively and substantially continuously closed, followed by additionally progressively deforming.

20. A device for protecting an object from shocks and vibrations, said object having an external surface, said device comprising a plurality of unitary tubular elements for placement in position for protecting said object, each of said tubular elements having a respective longitudinal axis and being comprised of deformable material and being capable of progressively deforming and substantially resuming dimensional and load-carrying properties after having a force applied to it substantially transverse to its longitudinal axis thereof, each of said tubular elements comprising, in transverse cross-section, an outer periphery, defining a total area, and an inner periphery, defining an open area, wherein said open area is approximately between 1% and 25of said total area, wherein in said position for protecting said object, said plurality of tubular elements are positioned such that respective longitudinal axes of said tubular elements extend substantially along said external surface of said object to thereby absorb forces transverse to said longitudinal axes.

21. The device of claim 20 in combination with a packaging structure, wherein said device is insertable within said packaging structure for protecting said object from shocks and vibrations during transport.

22. The device and structure of claim 21 wherein a number of said plurality of tubular elements are connected together, and wherein only tubular elements are connected together.

23. The packaging system of claim 22 wherein said open area is approximately between 3% and 10% of said total area.

24. The device and structure of claim 21 wherein said plurality of tubular elements have substantially the same cross-sectional shape and dimensions.

25. The device of claim 20 wherein said open area is approximately between 3% and 10% of said total area.

26. The device of claim 20 wherein said outer periphery of each of said unitary tubular elements comprises means for contacting the inner surface of a packing box and the outer surface of said object.

27. The device of claim 20 wherein each of said unitary tubular elements is independently positionable relative to each other and said object.

28. A device for protecting an object from shocks and vibrations, said object having an external surface, said device comprising a plurality of unitary tubular elements for placement in position for protecting said object, each of said tubular elements having a respective longitudinal axis and being comprised of deformable material and being capable of progressively deforming and substantially resuming dimensional and load-carrying properties after having a force applied to each of said tubular elements substantially transverse to a longitudinal axis thereof, each of said tubular elements comprising, in transverse cross-section, an outer periphery, defining a total area, and an inner periphery, defining an open area, wherein said open area is approximately between 1% and 25% of said total area, wherein in said position for protecting said object, said plurality of tubular elements are positioned such that respective longitudinal axes of said tubular elements extend substantially along said external surface of said object to thereby absorb forces transverse to said longitudinal axes, wherein a number of said plurality of tubular elements are connected together, and wherein only tubular elements are connected together.

29. A method of protecting an object from shocks and vibrations with a device, said object having an external surface, said device comprising a plurality of unitary tubular elements for placement in position for protecting said object, each of said tubular elements having a respective longitudinal axis and comprised of deformable material and being capable of progressively deforming and substantially resuming dimensional and load-carrying properties after having a force applied to it substantially transverse to its longitudinal axis, each of said tubular elements comprising, in transverse cross-section, an outer periphery, defining a total area, and an inner periphery, defining an open area, wherein said open area is approximately between 1% and 25% of said total area, wherein in said position for protecting said object, said plurality of tubular elements are positioned such that respective longitudinal axes of said tubular elements extend substantially along said external surface of said object to thereby absorb forces transverse to said longitudinal axes, said method comprising the step of:

positioning each of said plurality of tubular elements relative to said object such that respective longitudinal axes of said tubular elements extend substantially along said external surface of said object to thereby absorb forces transverse to said longitudinal axes.

30. The method of claim 29 further comprising the step of at least partially enveloping said object and said plurality of tubular elements with a packaging structure.

31. The method of claim 29 wherein said step of positioning each of said plurality of tubular elements comprises directly affixing each of said plurality of tubular elements directly to said object.

32. The method of claim 29 wherein said step of positioning each of said plurality of tubular elements comprises affixing each of said plurality of tubular elements relative to said object by means of adhesive.

33. The method of claim 29 further comprising, prior to said step of positioning each of said plurality of tubular elements relative to said object, the step of positioning at least one sheet of material adjacent said object, against which at least a respective one of said plurality of tubular elements is positioned.

34. The method of claim 29 wherein said object comprises at least two substantially oppositely facing surfaces and wherein said step of positioning each of said plurality of tubular elements relative to said object comprises positioning respective ones of said plurality of tubular elements such that their respective longitudinal axes extend along corresponding ones of said at least two substantially oppositely facing surfaces of said object.

35. The method of claim 29 wherein said step of positioning each of said plurality of tubular elements at least partially comprises sequentially positioning a number of said plurality of tubular elements relative to said object.

36. The method of claim 29 further comprising, prior to said step of positioning, the steps of extruding a tube of said deformable material, and cutting said tube into said plurality of tubular elements.

37. The method of claim 36 further comprising, following said step of cutting and prior to said step of positioning, the step of applying an adhesive to at least one surface of respective ones of said plurality of tubular elements.

* * * * *